Jan. 12, 1960   R. E. BUCK   2,920,896
CHUCK JAW TAKE-UP, INCLUDING A TAPERED GIB
Filed Nov. 6, 1957   2 Sheets-Sheet 1
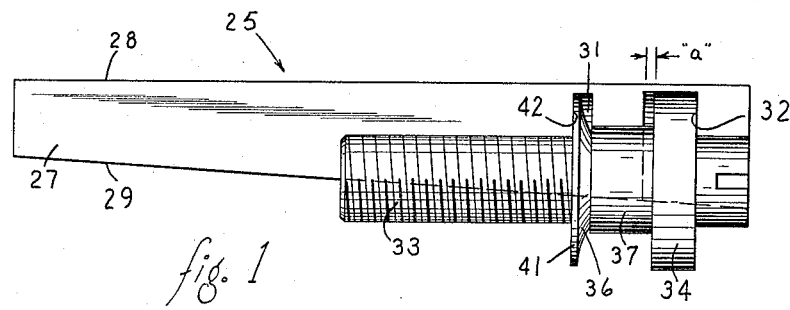
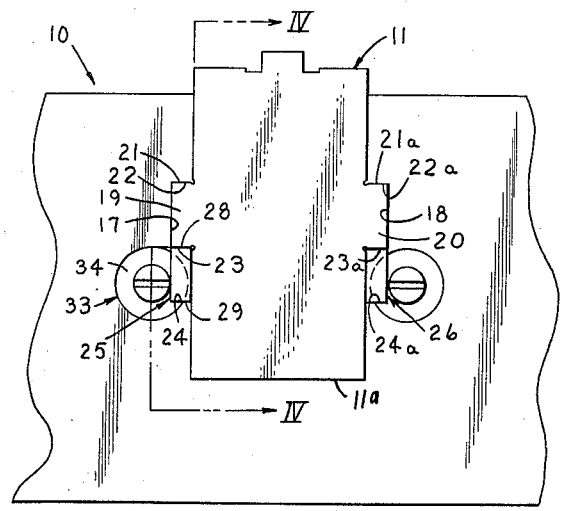
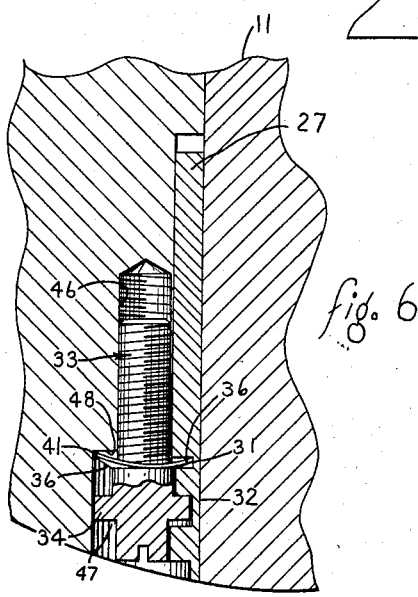
INVENTOR.
RUSSELL E. BUCK
BY
Woodhams, Blanchard & Flynn
ATTORNEYS Jan. 12, 1960

R. E. BUCK 2,920,896

CHUCK JAW TAKE-UP, INCLUDING A TAPERED GIB

Filed Nov. 6, 1957

INVENTOR.
RUSSELL E. BUCK
BY
Woodhams, Blanchard and Flynn
ATTORNEYS

United States Patent Office 2,920,896
Patented Jan. 12, 1960

2,920,896

CHUCK JAW TAKE-UP, INCLUDING A TAPERED GIB

Russell E. Buck, Scotts, Mich., assignor to Buck Tool Company, Kalamazoo, Mich., a corporation of Michigan Application November 6, 1957, Serial No. 694,843

4 Claims. (Cl. 279—123)

This invention relates to an improvement in chuck constructions and, more particularly, relates to a chuck construction having means for taking up wear of the chuck jaws and jaw guideways so that the jaws are at all times maintained in closely guided, yet slidable, relationship with respect to the jaw guideways.

Precision chucks are used in machining operations to accurately hold the work for contact with a tool. The chuck jaws and guideways wear as a normal result of the rigorous treatment which they receive during such operations and, additionally, in many instances during machining operations the chuck parts become heated. Such wear and/or heating may cause the chuck jaws to become loose within the guideway and thereby become incapable of accurately and precisely holding the work.

Prior art constructions attempting to take up such wear of the chuck jaws and guideways have been unsatisfactory for a variety of reasons. In some instances, the structures for taking up wear have been too complex for ordinary machine shop use. Other prior art structures required frequent adjustment to maintain proper operation of the jaws or required special chuck structures which were expensive to manufacture. In still other instances, the structure for taking up wear did not perform the desired function as well as is necessary for precision machining operations. Thus, insofar as I am aware, no satisfactory device for taking up wear of the chuck jaws and jaw guideways has been previously devised.

Accordingly, it is an object of this invention to provide an improved chuck construction including means for maintaining the chuck jaws in close guided engagement with the jaw guideways.

It is a further object of this invention to provide a gib structure locatable between the jaw guideway and the chuck jaw, which gib structure is adapted to hold the jaw in sliding, closely guided, contact with the jaw guideway.

It is a further object of this invention to provide a gib structure, as aforesaid, including a wedge movable radially with respect to the chuck body and contacting the jaw guideway and the jaw so that wear of the jaw and guideway can be taken up by moving the wedge member radially inwardly.

It is a further object of this invention to provide an improved gib structure, as aforesaid, in which the wedge is resiliently urged radially inwardly to compensate for wear or for temperature effects and thereby to constantly maintain contact between the chuck jaw and the guideway.

It is a further object of this invention to provide a gib structure, as aforesaid, which is inexpensive to manufacture, which can be readily incorporated in conventional chucks with only minor modifications of the structure thereof and which is effective in operation.

Other objects and advantages of the invention will become apparent to those acquainted with equipment of this type upon reading the following description and inspecting the accompanying drawings, in which:

Figure 1 is a side elevational view of the gib structure.

Figure 3 is a top view of a portion of a chuck showing the gib structure of the invention incorporated therein.

Figure 6 is a sectional view taken along the line VI—VI of Figure 5.

General description

In general, the invention provides a gib structure which includes an elongated tapered bar or wedge member which extends substantially radially of the chuck body and which is positioned between a chuck jaw and its associated guideway. An elongated rotatable threaded member is disposed within, and is radially movable on, the chuck body and lies adjacent a side wall of the bar. The threaded member preferably carries a spring ring thereon and has an integral flange spaced from said ring. The tapered bar or wedge member has a pair of axially spaced slots therein in the wider end thereof. The flange on the threaded member is received within one of the slots, said flange being of lesser axial thickness than said slot. The resilient ring is received within the other slot. As the threaded member is threaded into the chuck body the bar and the resilient ring will be moved inwardly until the bar or wedge member takes up all of the slack between the jaw and the jaw guideways. Further movement of the threaded member will cause distortion of the resilient ring which, in attempting to return to its undistorted condition, will impose a resilient force on the bar or wedge member urging it radially inwardly, thus, holding the chuck jaw and the guideway snugly, but slidably, together.

Detailed description

Figure 4:
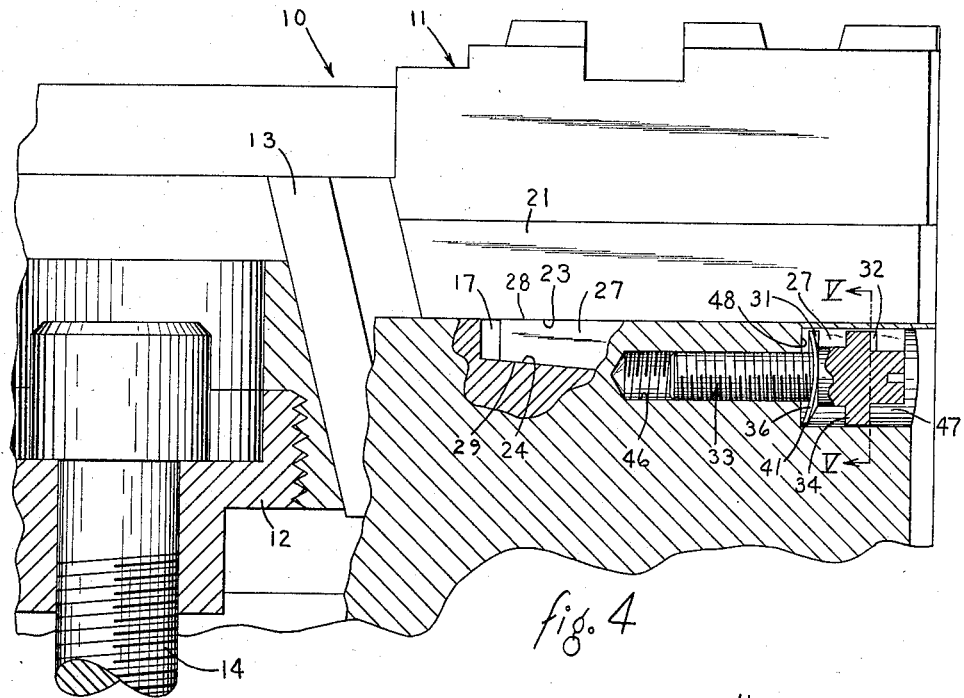
Figure 4 is a sectional view taken along the line IV—IV of Figure 3.

For purpose of convenience in describing the invention, the terms "forward" and "rearward" and derivatives thereof shall refer to a direction toward an away from, respectively, the jaw face of the chuck body, that is, upwardly and downwardly, respectively, of the structure as shown in Figures 3 and 4. The terms "radially inner" and "radially outer" and derivatives shall refer to direction toward and away from, respectively, the axis of the chuck that is, leftwardly and rightwardly of the chuck as appearing in Figure 4.

Referring to the drawings, particularly Figures 3 and 4, there is shown a portion of a chuck body 10 of any suitable construction. Such chuck body conventionally includes a plurality, usually three or more, of radially movable jaws, of which one appears at 11 in the drawings. Such jaws are adapted to be moved radially inwardly or outwardly in any convenient, conventional fashion. In the disclosed embodiment, the chuck jaws are moved radially by a wedge ring 12 (Figure 4) which engages a guiding structure 13 on the radially inward portion of the jaw. A longitudinally movable rod 14 is connected to the wedge ring 12 and is adapted to be moved longitudinally in response to a suitable axially applied force, such as fluid pressure. Thus, upon forward movement of the rod 14 (upwardly as appearing in Figure 4), the chuck jaws will be moved radially outwardly and upon rearward movement of the rod 14 (downwardly as appearing in Figure 4), the chuck jaws will be moved radially inwardly.

The chuck jaw 11 is received within a guideway 16 (Figure 3) in the chuck body. The guideway is defined by a substantially rectangular opening within the chuck body and has a pair of recesses or keyways 17 and 18 which extend sidewardly from the respective sides thereof. The chuck jaw 11 has oppositely extending flanges 19 and 20 on the respective sides thereof, which flanges fit within the recesses 17 and 18, respectively, and in this embodiment are spaced from the rearward surface 11a of the jaw 11 which spacing is, however, a matter of choice. The rearward surfaces 23 and 23a of flanges 19 and 20 are spaced from the rearward surfaces 24 and 24a of the recesses 17 and 18, respectively.

Gib structures 25 and 26 here shown as separate gibs on opposite sides of the jaw, are disposed within the recesses 17 and 18 between the surfaces 23 and 24 and between the surfaces 23a and 24a, respectively. Since the gib structures are identical, only gib structure 25 will be illustrated and described in detail herein, but, it will be understood that the description applies as well to gib structure 26, or to opposite sides of a single gib which may extend across the entire jaw against its surface 11a.

The gib structure 25 includes an elongated bar or wedge member 27 which has a forward wall 28 adapted to bear against the rearward surface 23 of the flange 21. The opposing wall 29 of the bar is adapted to contact the rearward surface 24 of the recess 17. Wall 29 extends at a slight angle toward the wall 28 to define a radially inwardly tapering wedge surface which bears against surface 24 of the recess 17. Surface 24 extends toward the forward face of the chuck body at a slight angle to define a corresponding wedge surface (Figure 4). The bar 27 has a pair of axially spaced recesses 31 and 32 in the radially outer or wider portion thereof.

An elongated threaded member 33 is positioned adjacent a side wall of the bar 27. The threaded member 33 has an integral flange 34 which extends into the recess 32 in the bar 27. The flange 34 is of lesser thickness axially than the corresponding dimension of the recess 31 so that the flange may move axially with respect to said bar a distance equal to the dimension "a" (Figure 1).

Figure 5:
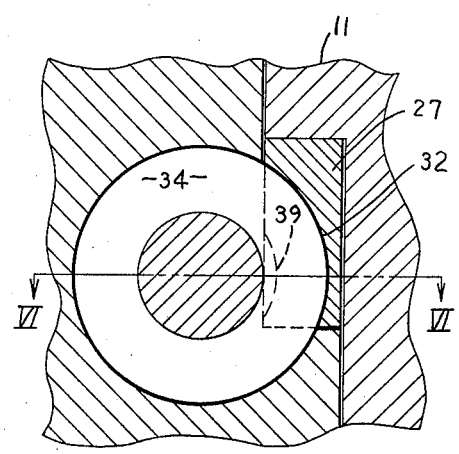
Figure 5 is a sectional view taken along the line V—V of Figure 4.
Figure 2:
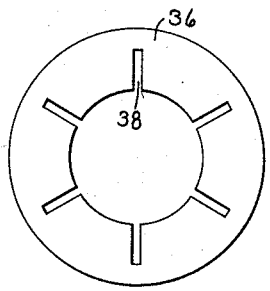
Figure 2 is a top view of the spring ring of the gib structure.

A dish-shaped resilient ring 36, which desirably is made of spring steel or similar material, is sleeved over the threaded member 33 and is adapted to abut against an enlargement or bushing 37 thereon. The ring 36 preferably has a plurality of radially extending slots 38 extending from the central opening therein to provide the desired resiliency thereof. A' portion of the ring 36 is received within the recess 31 in the bar 27 and the flange 41 (Figure 1) of the ring 36 is adapted to seat upon the radially inner wall 42 of the recess 32. The enlargement or bushing 37 is received within a small recess 39 (Figure 5) in the bar 27, which recess 39 is between the recesses 31 and 32. The spring ring 36, when unstressed, will hold the flange 34 in contact with the radially outer wall of slot 32 (Figure 1).

The threaded member 33 is disposed within a threaded opening 46 in the chuck body, said opening being adjacent the side wall of the recess 17. A counterbore 47 of said opening 46 defines an end wall 48 against which another portion of the flange 41 of the ring member 36 is adapted to abut. The flange 34 of the threaded member 33 is in sliding contact with the side wall of the counterbore 47.

*Assembly and operation*

In assembly, the bar 27, with the threaded member 33 and the ring 36 both in place with respect to said bar, is placed within the recess 17 with its wall 28 bearing against the surface 23 of the flange 19 on the chuck jaw and the threaded member 33 is introduced into the opening 46. The threaded member 33 is then threaded into the opening 46 until movement of bar 27 is blocked when the jaw and guideway structure prevent further inward movement thereof. During this movement of the threaded member, the flange 34 will be held against the radially outer wall of slot 32 by the spring ring 36. The counterbore 47 is of such depth that the ring 36 will remain spaced from the inner end wall 48 thereof a distance substantially equal to the dimension "a" when the bar 27 has moved to the maximum permissible extent inwardly between the flange 19 and the surface 24. The threaded member 33 is then threaded further inwardly until the flange 34 contacts the radially inner wall of the recess 32. Such further movement of the threaded member will force a portion of the flange 41 thereof against the inner end wall 48 of the counterbore 47 thereby causing distortion, and stressing, of the resilient ring 36.

As wear occurs either on the chuck jaw or in the walls defining the recess 17, the ring 36, in attempting to relieve the stress thereon, will urge the bar 27 radially inwardly with respect to the chuck body. Such radial inward movement of the bar, due to the contacting wedging surfaces 29 and 24 will urge the flange 19 on the chuck jaw into snug contacting engagement with the adjacent guideway. Thus, such movement of the bar 27 will take up wear and such movement will continue until the inner surface of the flange 34 contacts the radially inward wall of the slot 32. When this occurs, the ring 36 becomes substantially unstressed. Thus, the bar 27 is capable of being moved by the stressed spring ring 36 a distance approximately equal to the dimension "a" for each setting of the threaded member.

If the wear of flanges on the chuck jaws and/or the guideway is such that the fit therebetween becomes loose, after the completion of the spring induced movement of the bar 27 for any given setting of the rotatable member, additional movement of the bar 27 can be accomplished by deepening the counterbore 47 a further distance, which distance will again be an amount approximately equal to the dimension "a." Thereupon, the threaded member can be threaded further into the chuck body, as above described, to again stress the ring 36 and again provide for further movement of the bar 27. Thus, the gib structure can be used to accommodate substantial amounts of wear on the jaws simply by deepening the counterbore to the extent permitted by the structure of the chuck body.

Referring to the specific details of one successful commercial embodiment of the invention, the wedge bar 27 was 1¾₁₆ inches in length and the tapered wall 29 thereof positioned at an angle of 4° with respect to the wall 28. The flange 34 was ⅛ inch in thickness while the slot 32 was 5⁄32 inch in thickness so that the dimension "a" was 1⁄32 inch. Thus, the resilient ring 36 was adapted to move the bar 27 radially inwardly of the chuck body 1⁄32 inch for each setting of the gib structure.

While the gib structures 23 and 24 have herein been disclosed as contacting the axially rearward surfaces of the flanges 19 and 20 it is apparent that such structures could, if desired, be positioned adjacent the forward surfaces of the flanges 19 and 20. Also, one or the other of the wall 29 of the wedge member or surface 24 of the chuck body could be made untapered if desired but such would reduce the effectiveness of the gib structure somewhat since contact between the bar 27 and the wall 24 of the recess would not occur along the entirety of the surfaces thereof as occurs in the preferred embodiment of the invention.

Some advantageous results, particularly in compensating for wear only, can be obtained by a structure described and illustrated but omitting the spring 36 and the recess 31. However, this will require more frequent adjustment of the threaded member 33 in view of its lack of resilient follow-up.

Although a particular preferred embodiment of the invention has been described herein for illustrative purpose, it is to be understood that the invention contemplates such modifications or variations of the disclosed embodiment of the invention as will lie within the scope of the appended claims.

What is claimed is:

1. A gib structure for use with a chuck having a plurality of jaws and guideways for guiding radial movement of said jaws, comprising: an elongated, longitudinally tapered bar extending substantially radially of the chuck body and positioned within said chuck body between a jaw and its associated guideway with its narrow end being radially inwardly of its wide end; an elongated, rotatable threaded member within said chuck body and whose periphery lies adjacent a side wall of said bar, said member being threaded into said chuck body and being radially movable with respect to said bar; means defining a pair of radially spaced slots in said side wall of said bar in the radially outer portion thereof; a flange integral with said threaded member and lying in part within one of said slots, said flange being of lesser axial thickness than said one slot; a stiffly resilient ring mounted on and surrounding said threaded member, said ring lying in part within the other slot and being adapted to contact a wall in said chuck body.

2. A chuck structure, comprising: a chuck body having a plurality of radially movable work contacting jaws therein; means defining a guideway in said chuck body for each of said jaws, said guideway including recesses in the inner axial face thereof, said recesses having a radially extending wedging surface facing axially of said chuck body and opposed to an axial wall of the jaw received therewithin; an elongated, radially extending bar within each said recess, said bar having a wedge surface opposed to and contacting the wedge surface of said guideway and defining a radially inwardly extending taper, the opposite surface of said bar contacting said wall; an elongated rotatable threaded member threaded into said chuck body and being radially movable with respect to said bar, the periphery of said member lying adjacent a side wall of said bar, means defining a counterbore in said chuck body around said threaded member to provide a circumferentially extending surface therewithin surrounding said threaded member; means defining a slot in said side wall of said bar in the radially outer portion thereof; a flange integral with said threaded member and lying in part within said slot.

3. A chuck structure, comprising: a chuck body having a plurality of radially movable work contacting jaws therein, said jaws having a flange on either circumferential side thereof; means defining a guideway in said chuck body for each of said jaws, said guideway having recesses in either circumferential side thereof for receiving said jaw flanges, each of said recesses being of greater axial depth than said flanges and having a radially extending wedging surface facing axially of said chuck body and opposed to a wall of the flange received therewithin; an elongated, radially extending bar within each said recess, said bar having a wedge surface opposed to and contacting the wedge surface of said guideway and defining a radially inwardly extending taper, the opposite surface of said bar contacting said wall of said flange; an elongated rotatable threaded member threaded into said chuck and being radially movable with respect to said bar, the periphery of said member lying adjacent a side wall of said bar, means defining a counterbore in said chuck body around said threaded member to provide a circumferentially extending surface therewithin surrounding said threaded member; means defining a pair of radially spaced slots in said side wall of said bar in the radially outer portion thereof; a flange integral with said threaded member and lying in part within one of said slots, said flange being of lesser axial thickness than said one slot; a stiffly resilient ring mounted on and surrounding said threaded member, said ring lying in part within the other slot, said surface of said counterbore being located radially inwardly of said outer slot a slight distance whereby a portion of said ring diametrically opposite from said other slot may contact said surface when said ring is distorted.

4. A chuck structure, comprising: a chuck body having a plurality of radially directed guideways therein; a jaw disposed in each of said guideways and being slidable therein radially with respect to said chuck body, the inner axial face of said jaw having a plurality of planar, radial portions extending at right angles to the axis of the chuck body, said portions being located at substantially equal circumferential distances from the radial center line of said jaw; said chuck body having a face opposed to and substantially contiguous with said inner axial face of said jaw, said chuck body face having a plurality of radially extending tapering recesses therein opposed to said planar portions of said chuck jaws; an elongated radially extending bar within each recess, said bar having a radially extending, tapered surface contiguous with the wall of said recess, said bar also having a surface extending at right angles to the axis of said chuck and contiguous with the planar portion of said jaw, said bar having a slot formed therein adjacent its outer end; an elongated, radially extending screw threaded into said chuck body adjacent each of said bars, said screw having an enlarged flange thereon adjacent the radially outer end thereof, said flange in part being received in said slot.

References Cited in the file of this patent

UNITED STATES PATENTS

| | | |
|---|---|---|
| 1,372,726 | Sloan | Mar. 29, 1921 |
| 1,908,628 | Redinger | May 9, 1923 |
| 2,449,327 | Schlitters | Sept. 14, 1948 |
| 2,743,967 | Lappe | May 1, 1956 |